US012644565B2

(12) United States Patent
Stautner et al.

(10) Patent No.: US 12,644,565 B2
(45) Date of Patent: Jun. 2, 2026

(54) SUSPENSION SYSTEM FOR A CRYOGENIC TANK

(71) Applicant: General Electric Company, Schenectady, NY (US)

(72) Inventors: Ernst Wolfgang Stautner, Niskayuna, NY (US); Constantinos Minas, Slingerlands, NY (US)

(73) Assignee: General Electric Company, Evendale, OH (US)

( * ) Notice: Subject to any disclaimer, the term of this patent is extended or adjusted under 35 U.S.C. 154(b) by 387 days.

(21) Appl. No.: 17/883,895

(22) Filed: Aug. 9, 2022

(65) Prior Publication Data

US 2024/0052976 A1 Feb. 15, 2024

(51) Int. Cl.
*F17C 1/12* (2006.01)

(52) U.S. Cl.
CPC ........ *F17C 1/12* (2013.01); *F17C 2201/0109* (2013.01); *F17C 2203/0391* (2013.01);
(Continued)

(58) Field of Classification Search
CPC ................ F17C 1/12; F17C 2201/0109; F17C 2201/035; F17C 2201/054; F17C 2203/014; F17C 2203/0304; F17C 2203/0391; F17C 2203/0629; F17C 2203/0663; F17C 2205/0308; F17C 2209/22; F17C 2221/011; F17C 2221/012; F17C 2221/014; F17C 2221/016; F17C 2221/033; F17C 2223/0161; F17C 2223/033; F17C 2260/013; F17C 2265/066; F17C 2270/0189; F17C 3/08
See application file for complete search history.

(56) References Cited

U.S. PATENT DOCUMENTS

| | | |
|---|---|---|
| 2,195,213 A | 3/1940 | Heigis |
| 2,592,974 A | 4/1952 | Sulfrian |

(Continued)

FOREIGN PATENT DOCUMENTS

| | | |
|---|---|---|
| AT | 501732 A4 | 11/2006 |
| CA | 885178 A | 11/1971 |

(Continued)

OTHER PUBLICATIONS

JPH0712295 description (Year: 1995).*

(Continued)

*Primary Examiner* — Filip Zec
(74) *Attorney, Agent, or Firm* — Carter, DeLuca & Farrell, LLP

(57) ABSTRACT

A cryogenic system includes a cryogenic tank containing a liquid cryogen and a vacuum vessel surrounding the cryogenic tank and providing a vacuum space between an inner surface of the vacuum vessel and an outer surface of the cryogenic tank. The cryogenic system further includes a suspension system arranged within the vacuum space so as to support the cryogenic tank within the vacuum vessel and to maintain the cryogenic tank within the vacuum vessel in a desired position. The suspension system includes a plurality of roller elements arranged within the vacuum space and contacting the inner surface of the vacuum vessel and the outer surface of the cryogenic tank.

17 Claims, 9 Drawing Sheets

(52) U.S. Cl.
CPC ................. *F17C 2203/0629* (2013.01); *F17C 2205/0308* (2013.01); *F17C 2209/22* (2013.01); *F17C 2221/012* (2013.01); *F17C 2221/033* (2013.01); *F17C 2223/0161* (2013.01); *F17C 2265/066* (2013.01); *F17C 2270/0189* (2013.01)

(56) References Cited

U.S. PATENT DOCUMENTS 2,937,698 A 5/1960 Greenlee
2,962,195 A 11/1960 Greenlee
2,984,978 A 5/1961 Griffith
3,039,305 A 6/1962 Hall
3,043,466 A 7/1962 Gardner
3,252,610 A 5/1966 Greenlee
3,304,729 A * 2/1967 Chandler .................. F17C 3/02 62/48.3
3,392,220 A 7/1968 Jennings
4,049,221 A 9/1977 Fountain
4,184,609 A * 1/1980 Vorreiter ............... F17C 13/088 220/901
4,254,618 A 3/1981 Elovic
4,269,376 A 5/1981 Haux et al.
4,300,354 A 11/1981 Buchs et al.
4,472,946 A * 9/1984 Zwick ..................... F04B 41/02 417/901
4,552,325 A 11/1985 Bruensicke
4,579,249 A * 4/1986 Patterson .................. B60P 3/22 220/560.12
4,622,824 A 11/1986 Creedon
4,756,854 A 7/1988 Wegrzyn
4,784,959 A 11/1988 Wegrzyn
4,821,907 A 4/1989 Castles et al.
4,822,743 A 4/1989 Wegrzyn
4,837,541 A 6/1989 Pelc
4,844,743 A 7/1989 Koblenzer et al.
4,848,103 A * 7/1989 Pelc ...................... F17C 13/087 62/51.1
4,961,325 A 10/1990 Halvorson et al.
5,533,340 A * 7/1996 Shama ...................... F17C 3/08 220/901
5,548,962 A 8/1996 Luger et al.
5,582,016 A 12/1996 Gier et al.
5,746,397 A 5/1998 DeField et al.
6,651,932 B2 11/2003 Diehl et al.
6,978,621 B2 12/2005 Bunker et al.
6,984,465 B2 1/2006 Canepa et al.
7,117,663 B2 10/2006 Knapp
7,192,459 B2 3/2007 Puri et al.
7,281,681 B2 10/2007 MacCready et al.
7,287,558 B2 10/2007 Hobbs
7,293,418 B2 * 11/2007 Noble ..................... F17C 13/10 62/50.1
7,641,068 B2 * 1/2010 Immel ....................... F17C 3/08 220/560.12
7,743,940 B2 * 6/2010 Brunnhofer ............... F17C 1/06 220/592.27
7,752,885 B2 7/2010 Huang
7,806,365 B2 10/2010 Miller et al.
7,810,669 B2 10/2010 Westenberger
7,811,688 B2 10/2010 Flynn et al.
7,915,047 B2 3/2011 Thorn et al.
8,028,853 B2 10/2011 Hobbs et al.
8,028,951 B2 10/2011 MacCready et al.
8,113,708 B2 2/2012 Albertson
8,319,833 B2 11/2012 Weinstein et al.
8,394,553 B2 3/2013 Flynn et al.
8,430,237 B2 4/2013 Westenberger et al.
8,430,360 B2 4/2013 Schwarze et al.
8,470,933 B2 6/2013 Thorn et al.
8,778,545 B2 7/2014 Lehar et al.
8,789,379 B2 7/2014 Watts
8,858,679 B2 10/2014 Buhrman et al.
8,950,195 B2 2/2015 Watts
9,022,730 B2 5/2015 Vysohlid et al.
9,061,788 B2 6/2015 Veksler et al.
9,118,054 B2 8/2015 Gummalla et al.
9,239,008 B2 1/2016 Ekanayake et al.
9,269,205 B1 2/2016 Lamkin et al.
9,318,757 B2 4/2016 Koenig et al.
9,464,573 B2 10/2016 Remy et al.
9,604,730 B2 3/2017 Hagh et al.
9,676,491 B2 6/2017 Epstein et al.
9,683,910 B2 6/2017 Ekanayake et al.
9,834,315 B2 12/2017 Lo et al.
9,859,801 B2 1/2018 Wangemann et al.
9,897,041 B2 2/2018 Hoffjann et al.
9,954,414 B2 4/2018 Cunningham et al.
9,964,113 B2 5/2018 Westberg et al.
9,982,843 B2 5/2018 Kawai
10,082,246 B2 9/2018 Aceves et al.
10,112,486 B2 10/2018 Ban et al.
10,179,308 B2 1/2019 Schaeffer et al.
10,222,291 B2 3/2019 Thompson et al.
10,260,678 B2 4/2019 Christ
10,286,336 B2 5/2019 Durward
10,286,408 B2 5/2019 Lam et al.
10,312,536 B2 6/2019 Rheaume
10,386,259 B2 8/2019 Zhang et al.
10,415,756 B2 9/2019 Moddemann
10,451,218 B2 * 10/2019 Strange ..................... F17C 3/08
10,473,031 B2 11/2019 Ellsworth et al.
10,578,585 B1 3/2020 Gerardi et al.
10,584,616 B2 3/2020 Moxon
10,584,635 B2 3/2020 Armstrong et al.
10,619,569 B2 4/2020 Evetts et al.
10,800,525 B2 10/2020 Sankrithi et al.
10,823,066 B2 11/2020 Miller et al.
10,976,007 B2 * 4/2021 Karlsson ................. F17C 13/04
11,073,169 B2 7/2021 Thatte
11,125,165 B2 9/2021 Niergarth et al.
11,139,491 B2 10/2021 Kwon et al.
11,241,653 B2 2/2022 Claris
11,339,799 B2 * 5/2022 Yoshimoto .............. F04D 29/58
11,420,757 B2 * 8/2022 Clarke ................... B64D 31/00
11,655,809 B2 * 5/2023 McDonald .............. F04C 29/12 92/161
2004/0195246 A1 * 10/2004 Immel ..................... F17C 13/00 220/560.12
2006/0257094 A1 11/2006 McEvoy et al.
2009/0032539 A1 2/2009 Hobbs
2013/0139897 A1 6/2013 Kim et al.
2013/0299501 A1 11/2013 Lee et al.
2014/0026597 A1 1/2014 Epstein et al.
2014/0166662 A1 6/2014 Snyder et al.
2014/0174106 A1 * 6/2014 Tang ...................... B64D 37/30 62/50.2
2015/0101419 A1 4/2015 Hill et al.
2015/0211681 A1 * 7/2015 Conaughty ............... F17C 1/12 29/890.035
2015/0266589 A1 9/2015 Blumer et al.
2016/0305610 A1 * 10/2016 Karng ....................... F17C 3/08
2018/0224064 A1 * 8/2018 Aceves ..................... F17C 3/08
2018/0283769 A1 * 10/2018 Wikus ................ G01R 33/3804
2018/0346313 A1 * 12/2018 Feng ......................... F17C 9/02
2019/0003386 A1 1/2019 Stapp
2019/0009917 A1 1/2019 Anton et al.
2019/0145580 A1 * 5/2019 Posselt .................. F17C 13/001 220/560.12
2019/0190041 A1 6/2019 Godula-Jopek et al.
2020/0248870 A1 * 8/2020 Allidieres ............... F17C 5/007
2020/0340881 A1 * 10/2020 Hattori .................... G01M 3/20
2020/0348662 A1 11/2020 Cella et al.
2021/0062974 A1 3/2021 Tezuka et al.
2021/0098805 A1 4/2021 Poirier et al.
2021/0148283 A1 5/2021 Niergarth et al.
2021/0151783 A1 5/2021 Miftakhov
2021/0340908 A1 11/2021 Boucher et al.
2022/0009648 A1 1/2022 Clarke et al.
2022/0282835 A1 * 9/2022 McNicholas .......... B60K 15/04

(56) References Cited

U.S. PATENT DOCUMENTS

| | | | | |
|---|---|---|---|---|
| 2023/0067726 | A1* | 3/2023 | Light | F17C 13/025 |
| 2023/0160530 | A1* | 5/2023 | Light | F17C 13/04 62/50.1 |
| 2023/0375139 | A1* | 11/2023 | Cimadevilla García | F17C 13/001 |

FOREIGN PATENT DOCUMENTS

| | | | | |
|---|---|---|---|---|
| CN | 1627063 | A | 6/2005 | |
| CN | 200990131 | Y | 12/2007 | |
| CN | 201120842 | Y | 9/2008 | |
| CN | 106499947 | A | 3/2017 | |
| CN | 207712306 | U | 8/2018 | |
| CN | 109026710 | A | 12/2018 | |
| CN | 110529726 | A | 12/2019 | |
| DE | 102017223803 | A | 6/2019 | |
| EP | 0090334 | A2 | 10/1983 | |
| EP | 0090334 | B1 | 11/1986 | |
| EP | 3048281 | A1 | 7/2016 | |
| EP | 3805107 | A1 | 4/2021 | |
| FR | 2615903 | A1 | 12/1988 | |
| FR | 3096029 | A1 | 11/2020 | |
| GB | 953272 | A * | 3/1964 | F17C 13/086 |
| GB | 2587556 | A | 3/2021 | |
| JP | S5260420 | A | 5/1977 | |
| JP | H0712295 | A | 1/1995 | |
| JP | 2007024015 | A | 2/2007 | |
| JP | 2014025741 | A | 2/2014 | |
| JP | 2014084825 | A | 5/2014 | |
| JP | 2018131944 | A | 8/2018 | |
| KR | 20210125123 | A | 10/2021 | |
| WO | WO2005124246 | A1 | 12/2005 | |
| WO | WO2009018898 | A2 | 2/2009 | |
| WO | WO2011119338 | A1 | 9/2011 | |

OTHER PUBLICATIONS

Drafts, Acoustic Wave Technology Sensors, Fierce Electronics, Oct. 2000, 17 Pages.

Ke et al., Detecting Phase Transitions in Supercritical Mixtures: An Enabling Tool for Greener Chemical Reactions, Proceedings of the Royal Society A, vol. 466, 2010, pp. 2799-2812.

Ke et al., The Phase Equilibrium and Density Studies of the Ternary Mixtures of CO2 + Ar + N2 and CO2 + Ar + H2, Systems Relevance to CCS Technology, International Journal of Greenhouse Gas Control, vol. 56, Jan. 2017, pp. 55-56.

Fandino et al., Phase Behavior of (CO2 + H2) and (CO2 + N2) at Temperatures Between (218.15 and 303.15) K at Pressures up to 15 MPa, International Journal of Greenhouse Gas Control, vol. 36, May 2015, 39 Pages.

Fehrm, Bjorn's Corner: The Challenges of Hydrogen. Part 29. Gas Turbine Heat Management, Mar. 19, 2021, 3 Pages. Accessed on-line at: https://leehamnews.com/2021/03/19/bjorns-corner-the-challenges-of-hydrogen-part-29-gas-turbine-heat-management/.

Gonzalez-Portillo, A New Concept in Thermal Engineering Optimization: The Pericritical Cycle with Multi-Heating and Its Application to Concentrating Solar Power, Sep. 2019, 233 Pages. (Abstract Only) Retrieved Mar. 7, 2022 from Weblink: https://oa.upm.es/56492/.

Goos et al., Phase Diagrams of CO2 and CO2—N2 Gas Mixtures and Their Application in Compression Processes, Energy Procedia, vol. 4, 2011, pp. 3778-3785.

Javed et al., Thermodynamic Speed of Sound Data for Liquid and Supercritical Alcohols, Journal of Chemical & Engineering Data, vol. 64, No. 3, 2019, pp. 1035-1044.

Legoix et al., Phase Equilibria of the CH4—CO2 Binary and the CH4—CO2—H2O Ternary Mixtures in the Presence of a CO2-Rich Liquid Phase, 10122034, Energies, vol. 10, 2017, 11 Pages.

Oag et al., Probing the Vapor-Liquid Phase Behaviors of Near-Critical and Supercritical Fluids Using a Shear Mode Piezoelectric Sensor, Analytical Chemistry, vol. 75, No. 3, Feb. 1, 2003, p. 479-485.

Park et al., Measurements of Density and Sound Speed in Mixtures Relevant to Supercritical CO2 Cycles, Journal of Energy Resources Technology, vol. 142, Oct. 2020, 7 Pages.

Wetenhall et al., The Effect of CO2 Purity on the Development of Pipeline Networks for Carbon Capture and Storage Schemes, International Journal of Greenhouse Gas Control, vol. 30, 2014, pp. 197-211.

Zheng et al., The Application of Carbon Fiber Composites in Cryotank, Solidification, IntechOpen, 2018, 21 Pages. (Abstract Only) Retrieved from Website: www.intechopen.com/chapters/58970.

Chinese Office Action issued in corresponding application 202310669016.0, dated Nov. 24, 2025, together with English language machine translation.

* cited by examiner

SUSPENSION SYSTEM FOR A CRYOGENIC TANK

FEDERALLY SPONSORED RESEARCH

This invention was made with government support under contract number 80NSSC19M0125 awarded by The National Aeronautics and Space Administration (NASA). The U.S. government may have certain rights in the invention.

FIELD

The present disclosure relates to cryogenic systems, and more particularly to cryogenic systems for turbine engines.

BACKGROUND

The propulsion system for commercial aircraft typically includes one or more aircraft engines, such as turbofan jet engines. The turbofan jet engine(s) may be mounted to a respective one of the wings of the aircraft, such as in a suspended position beneath the wing using a pylon. These engines may be powered by aviation turbine fuel, which is typically a combustible hydrocarbon liquid fuel, such as a kerosene-type fuel, having a desired carbon number. The aviation turbine fuel is a relatively power-dense fuel that is relatively easy to transport and stays in a liquid phase through most ambient operating conditions for aircraft. Such fuel produces carbon dioxide upon combustion, and improvements to reduce such carbon dioxide emissions in commercial aircraft are desired.

Furthermore, current approaches to cooling in conventional turbine engine applications use compressed air or conventional liquid jet fuel. Use of compressor air for cooling may lower efficiency of the engine system. Moreover, as mentioned, conventional liquid jet fuel produces carbon dioxide.

Thus, certain turbofan jet engines have employed cryogenic liquid fuels, such as liquefied natural gas (LNG) or liquid hydrogen, which may be more environmentally friendly and cheaper than conventional liquid jet fuels.

Accordingly, it is desirable to have aircraft systems propelled by turbofan jet engines that can be operated using cryogenic liquid fuels. Therefore, the present disclosure is directed to an improved cryogenic system for turbofan jet engines.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
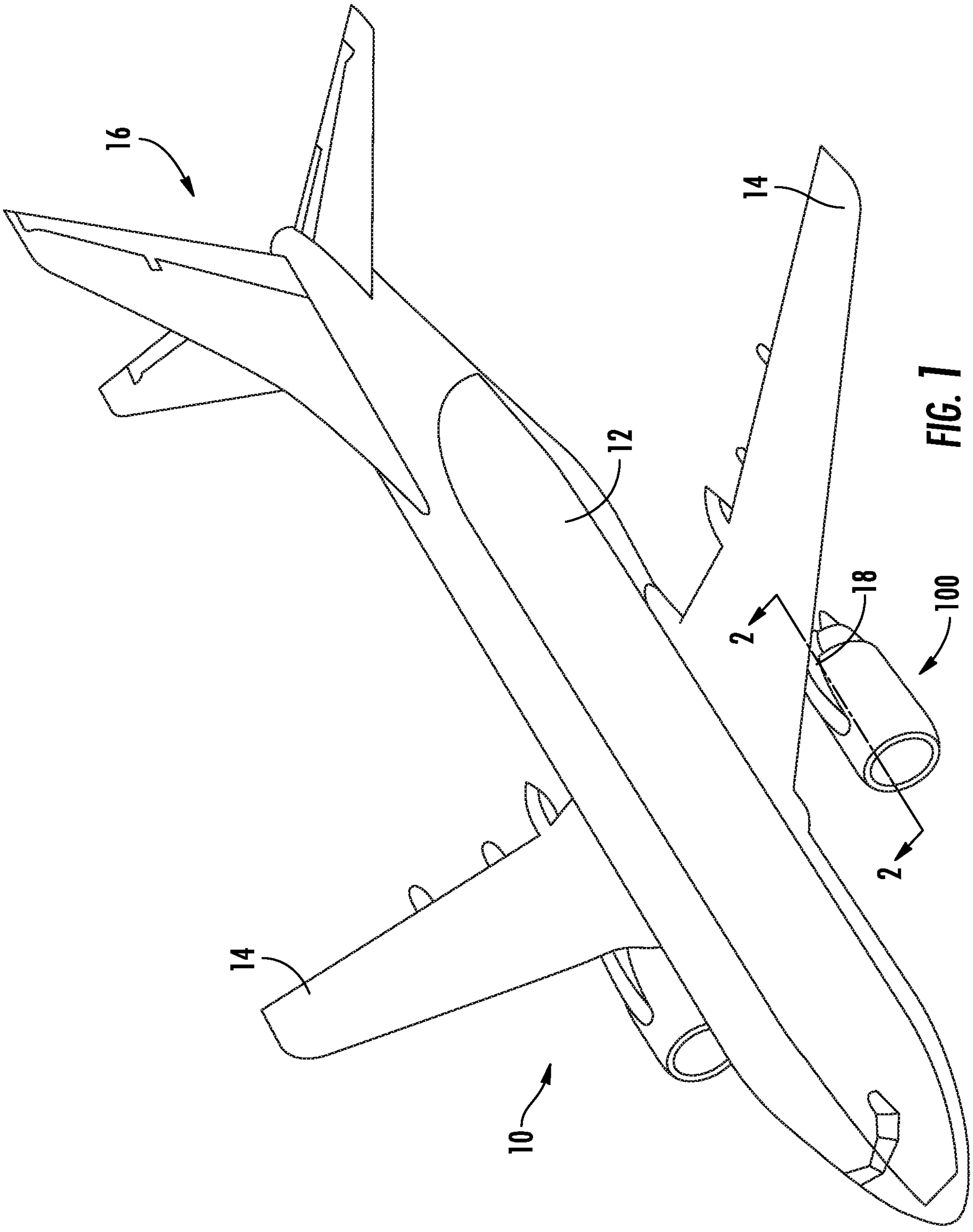
FIG. 1 is a schematic perspective view of an aircraft having an engine according to an embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "attached to", and the like refer to both direct coupling, fixing, or attaching, as well as indirect coupling, fixing, or attaching through one or more intermediate components or features, unless otherwise specified herein.

As may be used herein, the terms "first", "second", "third" and so on may be used interchangeably to distinguish one component from another and are not intended to signify location or importance of the individual components.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Conventional cryogenic tanks require a suspension system in order to support the cryogen-containing tank from the outer vacuum vessel. Conventional suspension systems include suspension tubes or rods, which are common when both the cryogen-containing tank and the vacuum vessel are metallic. However, suspension/rods are more difficult to implement when either the cryogen-containing tank or the vacuum vessel is made of composite materials. For example, when the cryogen-containing tank and/or the vacuum vessel is made of composite materials, special suspension components have to be integrated within the winding of the composite tank and/or the composite vessel.

Accordingly, the present disclosure is directed to an improved suspension system for a cryogenic system. In particular, the suspension system of the present disclosure supports a cryovessel (e.g., the inner cryogen-containing tank) of the cryogenic system with respect to the vacuum vessel (e.g., the outer vessel). In particular, the cryogen-containing tank may be a liquid hydrogen ($LH_2$) tank or any other cryogenic tank (e.g., containing LHe, $LN_2$, $LO_2$, etc.) with dual walls. As such, the suspension system can be used in any cryogenic tank with a vacuum environment. More particularly, in an embodiment, the suspension system may include a plurality of roller elements (e.g., either spheres or wheels) arranged in a guide rail or connected together via suspension members to enable easy assembly and/or positioning of the cryogenic tank within the vacuum vessel. As such, in an embodiment, the suspension system provides a very low parasitic heat load and easy access to the inner vacuum vessel for service. For example, the roller elements are arranged in the radial space between the cryogen-containing tank and the vacuum vessel and can be mechanically anchored to the stiffeners of the vacuum vessel. Further, the suspension system results in a low boil-off solution since the roller elements of the system only make point contact with both the vacuum vessel and cryogen-containing tank. Moreover, the suspension system provides only point-to-point contact between the roller elements and the cryogenic tank and between the roller elements and the vacuum vessel, thereby providing a suspension system distributed along a length of a central axis the cryogenic tank. In addition, the suspension system having the roller elements described herein provides a system with increased dynamic stiffness and reduced vibration.

Referring now to the drawings, FIG. 1 illustrates a perspective view of an aircraft 10 that may implement various preferred embodiments. As shown, the aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engines 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are each capable of selectively generating a propulsive thrust for the aircraft 10. The amount of propulsive thrust may be controlled at least in part based on a volume of fuel provided to the turbine engine 100 via a fuel system 200 (see FIG. 3). In the embodiments discussed herein, the fuel is a cryogen fuel, such as liquid hydrogen fuel or liquid natural gas (LNG), that is stored in a liquid fuel tank 206 (see FIG. 3) of the fuel system 200. In certain embodiments, at least a portion of the liquid fuel tank 206 may be located in each wing 14 (FIG. 1) and a portion of the liquid fuel tank 206 may be located in the fuselage 12 between the wings 14. The liquid fuel tank 206, however, may be located at other suitable locations in the fuselage 12 or the wing 14. The liquid fuel tank 206 may also be located entirely within the fuselage 12 or the wing 14. The liquid fuel tank 206 may also be separate tanks instead of a single, unitary body, such as, for example, two tanks each located within a corresponding wing 14.

For the embodiment depicted, the power generator is an engine 100 and, in particular, a high bypass turbofan engine. The engine 100 may also be referred to as a turbofan engine 100 herein. FIG. 2 is a schematic, cross-sectional view of one of the engines 100 used in the propulsion system for the aircraft 10 shown in FIG. 1. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

Figure 2:
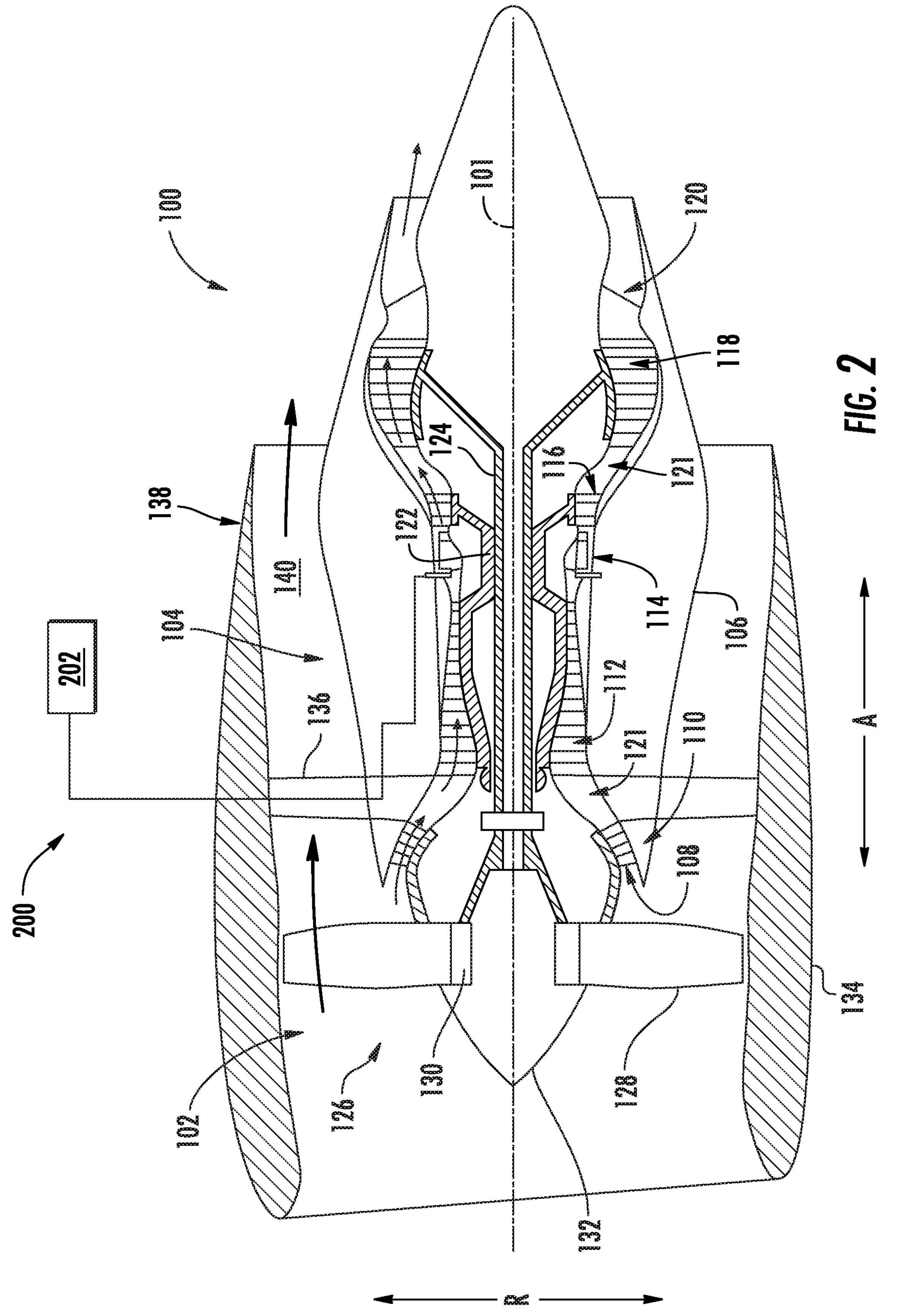
FIG. 2 is a schematic, cross-sectional view, taken along line 2-2 in FIG. 1, of a turbine engine that is used as a power generator for the aircraft shown in FIG. 1.

The turbomachine 104 depicted in FIG. 2 includes a tubular outer casing 106 that defines an annular inlet 108. The outer casing 106 encases, in a serial flow relationship, a compressor section including a booster or low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flow path 121 extending from the annular inlet 108 to the jet exhaust nozzle section 120. The turbofan engine 100 further includes one or more drive shafts. More specifically, the turbofan engine 100 includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130 in a spaced-apart manner. The fan blades 128 and disk 130 are rotatable, together, about the longitudinal centerline (axis) 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104, so as to define a bypass airflow passage 140 therebetween.

It will be appreciated, however, that the turbofan engine 100 discussed herein is provided by way of example only. In other embodiments, any other suitable engine may be utilized with aspects of the present disclosure. For example, in other embodiments, the turbofan engine 100 may be any other suitable gas turbine engine, such as a turboshaft engine, a turboprop engine, a turbojet engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a turbine engine may be a geared turbine engine (i.e., including a gearbox between the fan 126 and shaft driving the fan, such as the LP shaft 124), may be a variable pitch turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines, as discussed above.

Figure 3:
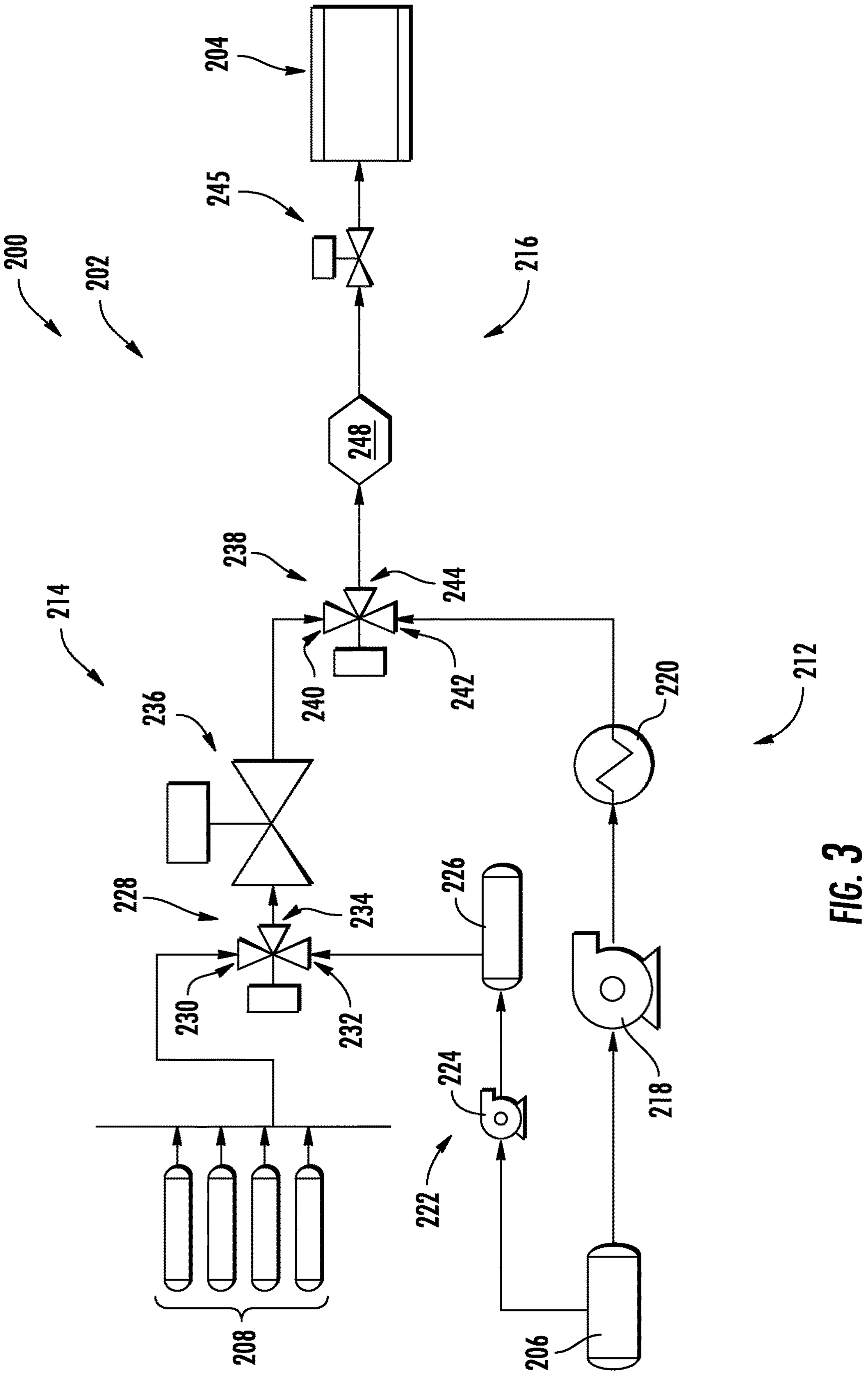
FIG. 3 is a schematic view of an embodiment of a fuel system according to the present disclosure.

Referring to FIGS. 2 and 3, the turbofan engine 100 is operable with the fuel system 200 and receives a flow of fuel from the fuel system 200. As will be described further below, the fuel system 200 includes a fuel delivery assembly 202 providing the fuel flow from the liquid fuel tank 206 to the turbofan engine 100, and, more specifically, to a fuel manifold (not shown) of the combustion section 114 of the turbomachine 104 of the turbofan engine 100.

More particularly, FIG. 3 illustrates a schematic view of the fuel system 200 according to an embodiment of the present disclosure that is configured to store the fuel for the engine 100 in the liquid fuel tank 206 and to deliver the fuel to the engine 100 via the fuel delivery assembly 202. In an embodiment, the fuel system 200 may be suitable for a vehicle having an engine 204 (e.g., the engine 100) in accordance with an exemplary embodiment of the present disclosure is provided. More specifically, for the exemplary embodiment of FIG. 3, the vehicle may be an aeronautical vehicle, such as the exemplary aircraft 10 of FIG. 1, and the engine 204 may be an aeronautical gas turbine engine, such as the exemplary engines 100 of FIG. 1 and/or the exemplary turbofan engine 100 of FIG. 2.

It will be appreciated, however, that in other embodiments, the vehicle may be any other suitable land or aeronautical vehicle and the engine 204 may be any other suitable engine mounted to or within the vehicle in any suitable manner.

The exemplary fuel system 200 depicted is generally a hydrogen fuel system configured to store a hydrogen fuel and provide the hydrogen fuel to the engine 204.

For the embodiment shown, the fuel system 200 generally includes a liquid cryogenic fuel tank 206 for holding a first portion of cryogenic fuel in a liquid phase. The liquid cryogenic fuel tank 206 may more specifically be configured to store the first portion of cryogenic fuel, such as hydrogen fuel, substantially completely in the liquid phase. For example, the liquid cryogenic fuel tank 206 may be configured to store the first portion at a temperature of about −253° C. or less, and at a pressure greater than about one bar and less than about 10 bar, such as between about three bar and about five bar, or at other temperatures and pressures to maintain the cryogenic fuel substantially in the liquid phase.

It will be appreciated that as used herein, the term "substantially completely" as used to describe a phase of the cryogenic fuel refers to at least 99% by mass of the described portion of the cryogenic fuel being in the stated phase, or such as at least 97.5%, such as at least 95%, such as at least 92.5%, such as at least 90%, such as at least 85%, such as at least 75% by mass of the described portion of the cryogenic fuel being in the stated phase.

The fuel system 200 further includes a gaseous cryogenic fuel tank 208 configured to store a second portion of cryogenic fuel in a gaseous phase. The gaseous cryogenic fuel tank 208 may be configured to store the second portion of cryogenic fuel at an increased pressure so as to reduce a necessary size of the gaseous cryogenic fuel tank 208 within the aircraft 10. For example, in an embodiment, the gaseous cryogenic fuel tank 208 may be configured to store the second portion of cryogenic fuel at a pressure of at least about 100 bar, such as at least about 200 bar, such as at least about 400 bar, such as at least about 600 bar, such as at least about 700 bar, and up to about 1,000 bar. The gaseous cryogenic fuel tank 208 may be configured to store the second portion of the cryogenic fuel at a temperature within about 50° C. of an ambient temperature, or between about −50° C. and about 100° C.

It will be appreciated, that for the embodiment depicted, the gaseous cryogenic fuel tank 208 is more specifically a plurality of gaseous cryogenic fuel tanks. In such embodiments, the plurality of gaseous cryogenic fuel tanks are configured to reduce an overall size and weight that would otherwise be needed to contain the desired volume of the second portion of cryogenic fuel in the gaseous phase at the desired pressures.

As will further be appreciated, a substantial portion of the total cryogenic fuel storage capacity of the fuel system 200 is provided by the liquid cryogenic fuel tank 206. For example, in certain exemplary embodiments, the fuel system 200 defines a maximum fuel storage capacity. The liquid cryogenic fuel tank 206 may provide more than 50% of the maximum fuel storage capacity (in kilograms), with the remaining portion provided by the gaseous cryogenic fuel tank 208. For example, in certain exemplary aspects, the liquid cryogenic fuel tank 206 may provide at least about 60% of the maximum fuel storage capacity, such as at least about 70% of the maximum fuel storage capacity, such as at least about 80% of the maximum fuel storage capacity, such as up to about 98% of the maximum fuel storage capacity, such as up to about 95% of the maximum fuel storage capacity. The gaseous cryogenic fuel tank 208 may be configured to provide the remaining fuel storage capacity, such as at least about 2% of the maximum fuel storage capacity, such as at least about 5% of the maximum fuel storage capacity, such as at least about 10% of the maximum fuel storage capacity, such as at least about 15% of the maximum fuel storage capacity, such as at least about 20% of the maximum fuel storage capacity, such as up to 50% of the maximum fuel storage capacity, such as up to about 40% of the maximum fuel storage capacity.

Referring still to FIG. 3, the fuel system 200 further includes the fuel delivery assembly 202. The fuel delivery assembly 202 generally includes a liquid cryogenic delivery assembly 212 in fluid communication with the liquid cryogenic fuel tank 206, a gaseous cryogenic delivery assembly 214 in fluid communication with the gaseous cryogenic fuel tank 208, and a regulator assembly 216 in fluid communication with both the liquid cryogenic delivery assembly 212 and the gaseous cryogenic delivery assembly 214 for providing cryogenic fuel to the engine 204.

The liquid cryogenic delivery assembly 212 generally includes a pump 218 and a heat exchanger 220 located downstream of the pump 218. The pump 218 is configured to provide a flow of the first portion of cryogenic fuel in the liquid phase from the liquid cryogenic fuel tank 206 through the liquid cryogenic delivery assembly 212. Operation of the pump 218 may be increased or decreased to effectuate a change in a volume of the first portion of cryogenic fuel through the liquid cryogenic delivery assembly 212, and to the regulator assembly 216 and engine 204. The pump 218 may be any suitable pump configured to provide a flow of liquid cryogenic fuel. For example, in certain exemplary aspects, the pump 218 may be configured as a cryogenic pump.

Still referring to FIG. 3, it will be appreciated that the liquid cryogenic fuel tank 206 may define a fixed volume, such that as the liquid cryogenic fuel tank 206 provides cryogenic fuel to the fuel system 200 substantially completely in the liquid phase, a volume of the liquid cryogenic fuel in the liquid cryogenic fuel tank 206 decreases, and the volume is made up by, e.g., gaseous cryogenic fuel. Further, during the normal course of storing the first portion of cryogenic fuel in the liquid phase, an amount of the first portion of cryogenic fuel may vaporize.

In order to prevent an internal pressure within the liquid cryogenic fuel tank 206 from exceeding a desired pressure threshold, the fuel system 200 is configured to allow for a purging of gaseous cryogenic fuel from the liquid cryogenic fuel tank 206. More specifically, in an embodiment, the fuel delivery assembly 202 of the fuel system 200 includes a boil-off fuel assembly 222 configured to receive gaseous cryogenic fuel from the liquid cryogenic fuel tank 206. The boil-off fuel assembly 222 generally includes a boil-off compressor 224 and a boil-off tank 226. The boil-off tank 226 is in fluid communication with the liquid cryogenic fuel tank 206 and is further in fluid communication with the gaseous cryogenic delivery assembly 214.

During operation, gaseous fuel from the liquid cryogenic fuel tank 206 may be received in the boil-off fuel assembly 222, may be compressed by the boil-off compressor 224 and provided to the boil-off tank 226. The boil-off tank 226 may be configured to store the gaseous cryogenic fuel at a lower pressure than the pressure of the second portion of the cryogenic fuel within the gaseous cryogenic fuel tank 208.

Referring again to the gaseous cryogenic delivery assembly 214, the gaseous cryogenic delivery assembly 214 generally includes a three-way boil-off valve 228 defining a first input 230, a second input 232, and an output 234. The first input 230 may be in fluid communication with the gaseous cryogenic fuel tank 208 for receiving a flow of the second portion of cryogenic fuel in the gaseous phase from the gaseous cryogenic fuel tank 208. For the embodiment depicted, the second input 232 is in fluid communication with the boil-off fuel assembly 222 for receiving a flow of gaseous cryogenic fuel from, e.g., the boil-off tank 226 of the boil-off fuel assembly 222. The three-way boil-off valve 228 may be configured to combine and/or alternate the flows from the first input 230 and the second input 232 to a single flow of gaseous cryogenic fuel through the output 234. For the embodiment shown, the three-way boil-off valve 228 is an active valve, such that an amount of gaseous cryogenic fuel provided from the first input 230, as compared to the amount of gaseous cryogenic fuel provided from the second input 232, to the output 234 may be actively controlled. In other exemplary embodiments, the three-way boil-off valve 228 may be a passive valve.

The fuel system 200 may also include a gaseous hydrogen delivery assembly flow regulator 236 ("GHDA flow regulator 236"). The GHDA flow regulator 236 may be configured as an actively controlled variable throughput valve configured to provide a variable throughput ranging from 0% (e.g., a completely closed off position) to 100% (e.g., a completely open position), as well as a number of intermediate throughput values therebetween. As briefly mentioned, the regulator assembly 216 is in fluid communication with both the liquid cryogenic delivery assembly 212 and the gaseous cryogenic delivery assembly 214 for providing gaseous cryogenic fuel to the engine 204.

Moreover, and still referring to FIG. 3, the regulator assembly 216 includes a three-way regulator valve 238. The three-way regulator valve 238 defines a first input 240, a second input 242, and an output 244. The first input 240 may be in fluid communication with the gaseous cryogenic delivery assembly 214 for receiving a flow of the second portion of cryogenic fuel in the gaseous phase from the gaseous cryogenic fuel tank 208 (and, e.g., the boil-off fuel assembly 222). The second input 242 is in fluid communication with the liquid cryogenic delivery assembly 212 for receiving a flow of the first portion of the cryogenic fuel in the gaseous phase from the liquid cryogenic fuel tank 206 (vaporized using, e.g., the heat exchanger 220). The three-way regulator value 238 may be configured to combine and/or alternate the flows from the first input 240 and the second input 242 to a single flow of gaseous cryogenic through the output 244. For the embodiment shown, the three-way regulator value 238 is an active three-way regulator value, such that an amount of gaseous cryogenic fuel provided from the first input 240, as compared to the amount of gaseous cryogenic fuel provided from the second input 242, to the output 244 may be actively controlled. In other exemplary embodiments, the three-way regulator value 238 may be a passive valve.

For the embodiment shown, the regulator assembly 216 further includes a regulator assembly flow regulator 245 ("RA flow regulator 245") and a flowmeter 248. The RA flow regulator 245 may be configured as an actively controlled variable throughput valve configured to provide a variable throughput ranging from 0% (e.g., a completely closed off position) to 100% (e.g., a completely open position), as well as a number of intermediate throughput values therebetween.

As mentioned, the liquid fuel tank(s) 206 of the fuel system 200 contain a liquid cryogenic fuel. Thus, the fuel must be maintained at cryogenic temperatures such that the fuel remains in a substantially completely liquid phase. In order to maintain such temperatures, the liquid fuel tank(s) 206 are encompassed by a vacuum vessel that creates a vacuum space between the liquid fuel tank(s) 206 and the vacuum vessel. Furthermore, as mentioned, the liquid fuel tank(s) 206 requires a suspension system in order to support the liquid fuel tank(s) 206 within the vacuum vessel. Accordingly, the present disclosure is directed to an improved suspension system for a cryogenic fuel system. In particular, the cryogen-containing liquid fuel tank(s) 206 may be a liquid hydrogen ($LH_2$) tank or any other cryogenic tank (e.g., containing LHe, $LN_2$, $LO_2$, etc.) with dual walls. As such, the suspension system described herein can be used in any cryogenic tank with a vacuum environment.

Figure 4:
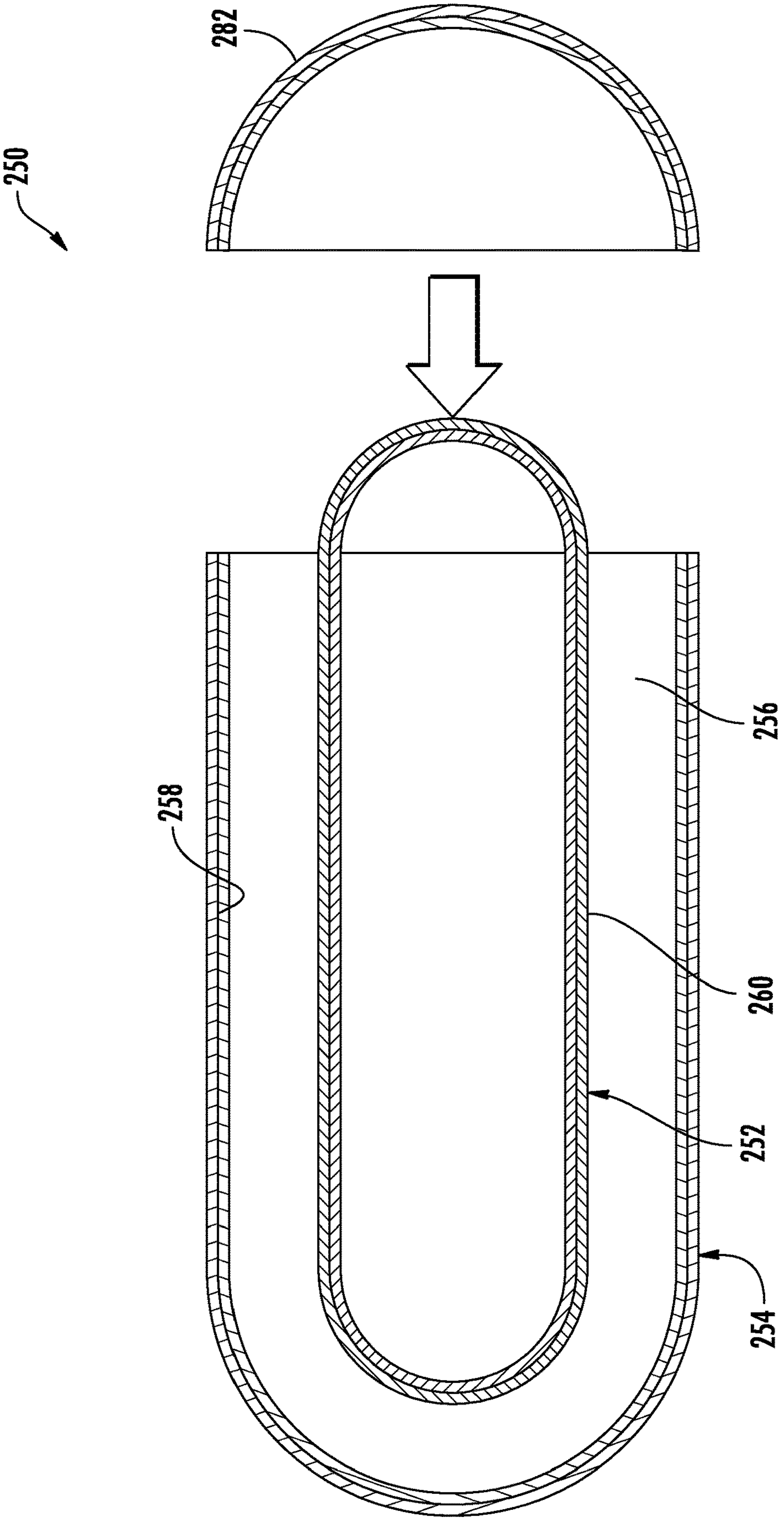
FIG. 4 is a side view of an embodiment of a cryogenic fuel system for an engine according to the present disclosure.

More particularly, in an embodiment, as shown in FIG. 4, a cryogenic fuel system 250 according to the present disclosure is illustrated. As shown, the cryogenic fuel system 250 includes a cryogenic tank 252 (such as liquid fuel tank(s) 206) containing a liquid cryogen and a vacuum vessel 254 surrounding the cryogenic tank 252. Thus, as shown, the vacuum vessel 254 provides a vacuum space 256 between an inner surface 258 of the vacuum vessel 254 and an outer surface 260 of the cryogenic tank 252. In the illustrated embodiment, the vacuum vessel 254 includes a removeable cap 282 (see e.g., FIG. 4).

In further embodiments, the cryogenic tank 252 and the vacuum vessel 254 may be made of any suitable materials. For example, in an embodiment, one or both of the cryogenic tank 252 and the vacuum vessel 254 may be constructed of a composite material. In alternative embodiments, one or both of the cryogenic tank 252 and the vacuum vessel 254 may be constructed of a metal material.

Moreover, as shown generally in FIGS. 5-12, the cryogenic fuel system 250 includes a suspension system 262 arranged within the vacuum space 256 so as to support the cryogenic tank 252 within the vacuum vessel 254 and to maintain the cryogenic tank 252 within the vacuum vessel 254 in a desired position. Further, in an embodiment, as shown particularly in FIGS. 5, 8, and 10, the suspension system 262 includes a plurality of roller elements 264 arranged within the vacuum space 256 and contacting the inner surface 258 of the vacuum vessel 254 and the outer surface 260 of the cryogenic tank 252. Thus, the roller elements 264 contact the inner surface 258 of the vacuum vessel 254 and the outer surface 260 of the cryogenic tank 252 at a plurality of different points along a longitudinal length of the cryogenic tank 252 so as to support the cryogenic tank 252 within the vacuum vessel 254, thereby maintaining the cryogenic tank 252 within the vacuum vessel 254 in a desired position (e.g., such as a centralized location in the vacuum vessel 254).

Figure 5:
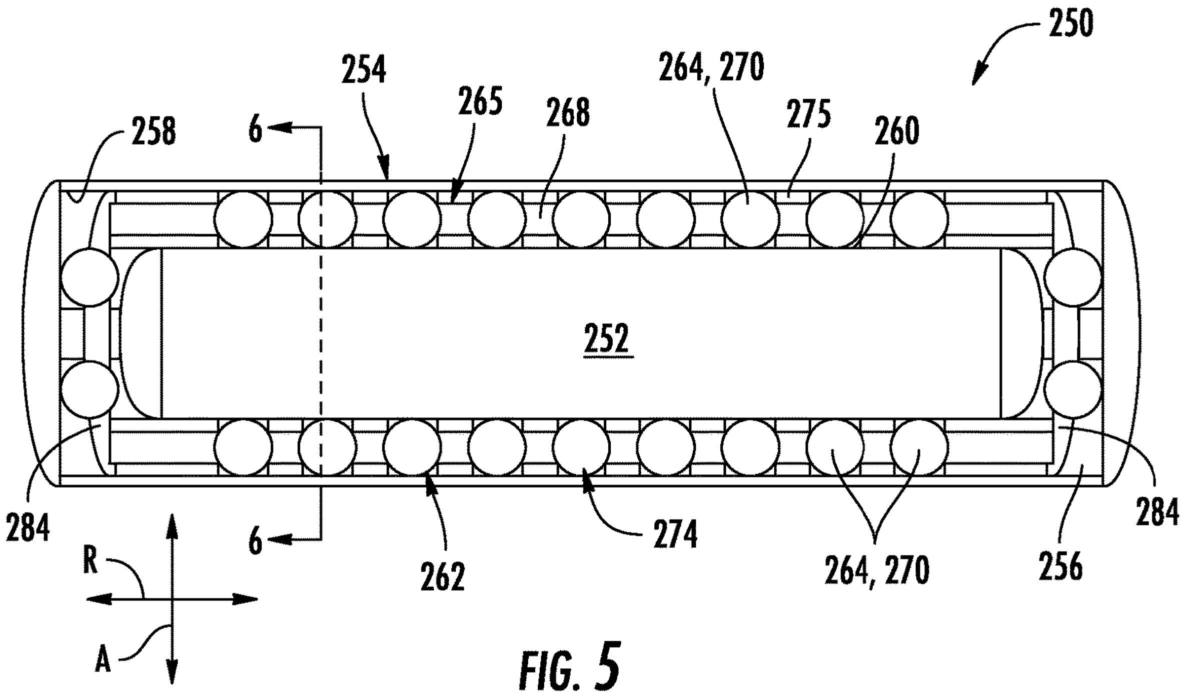
FIG. 5 is a side view of an embodiment of a cryogenic fuel system for an engine according to the present disclosure, particularly illustrating a suspension system for the cryogenic fuel system having a plurality of roller elements with insulation arranged therebetween.
Figure 10:
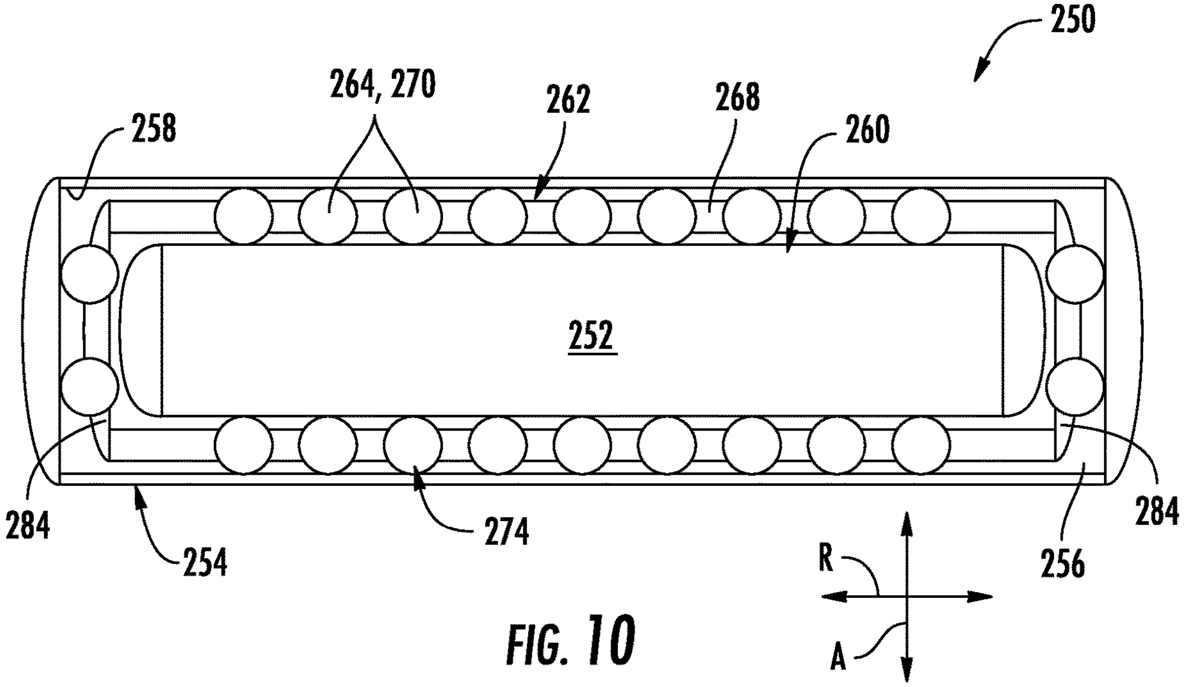
FIG. 10 is a side view of another embodiment of a cryogenic fuel system for an engine according to the present disclosure, particularly illustrating a suspension system for the cryogenic fuel system having a plurality of roller elements that provide radial and axial suspension of a liquid fuel tank of the cryogenic fuel system.
Figure 11A:
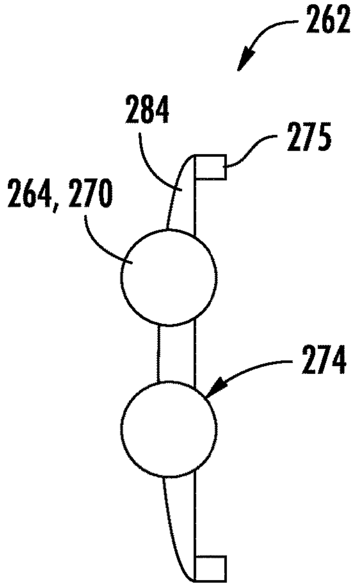
FIGS. 11A and 11B are front and side views of the cryogenic fuel system of FIG. 10.
Figure 11B:
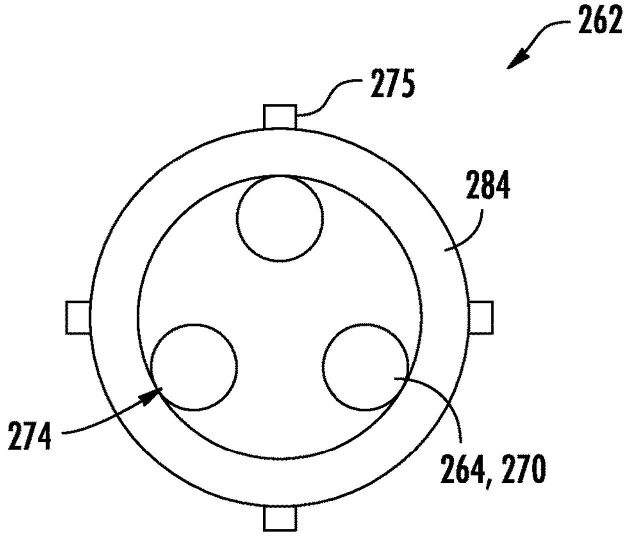

In particular embodiments, as shown in FIGS. 5, 10, 11A, and 11B, the suspension system 262 may include roller elements 264 that provide both axial and radial suspension, e.g., in an axial direction A and a radial direction R, respectively. For example, as shown particularly in FIGS. 5, 11A, and 11B, the suspension system 262 may provide suspension in the axial direction A using one or more axial suspension members 284 that can be placed at any suitable location along the cryogenic tank 252, such as at the front or back of the cryogenic tank 252. In such embodiments, the axial suspension member(s) 284 may have a generally dome shape with one or more holes that receive a subset of the roller elements 264. Moreover, as shown in FIGS. 5, 11A, and 11B, the axial suspension members 284 may include one or more locking features 275 (e.g., protrusions, notches, etc.) that lock the axial suspension members 284 to the radial suspension members 268. Further, as shown in FIGS. 11A and 11B, the locking features 275 may be spaced circumferentially about the axial suspension members 284 so as to provide adequate locking.

Furthermore, in certain embodiments, the cryogenic tank 252 may be slidable with respect to the vacuum vessel 254 via the roller elements 264. Accordingly, in an embodiment, the removable cap 282 (see FIG. 4) of the vacuum vessel 254 can be easily opened such that the cryogenic tank 252 can be slid therein.

Figure 6:
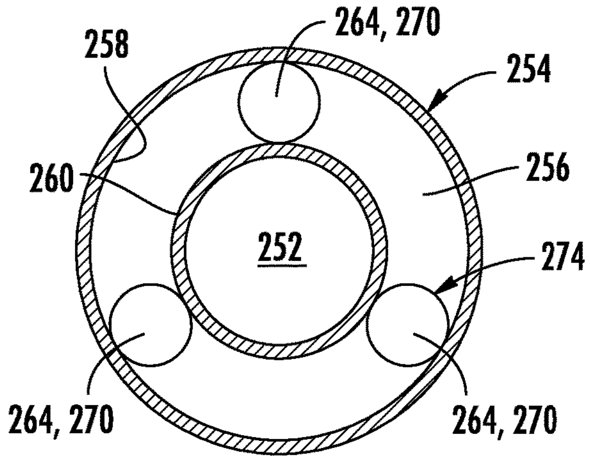
FIG. 6 is a cross-sectional view of the cryogenic fuel system of FIG. 5 along line 6-6.
Figure 7:
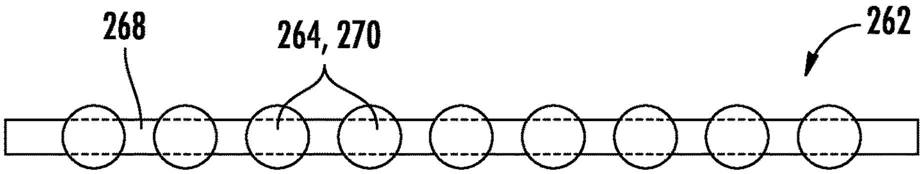
FIG. 7 is a side view of an embodiment of a row of roller elements for a radial suspension system for a cryogenic fuel system for an engine according to the present disclosure.
Figure 8:
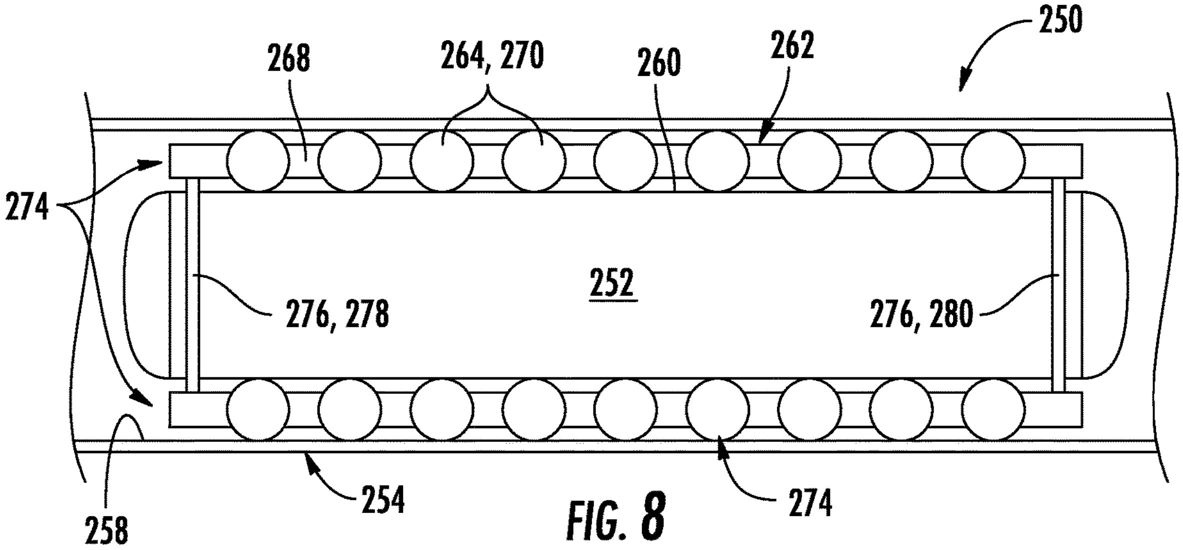
FIG. 8 is a side view of another embodiment of a cryogenic fuel system for an engine according to the present disclosure, particularly illustrating a radial suspension system for the cryogenic fuel system having a plurality of roller elements.

In an embodiment, for example, as shown in FIGS. 5-12, the plurality of roller elements 264 may be connected together via one or more guide rails 266 (FIG. 12) or one or more radial suspension members 268 or rod members (see e.g., FIGS. 5, 7, 8, and 10). More specifically, as shown in FIGS. 5-10, wherein the plurality of roller elements 264 are connected together via the radial suspension members 268, the roller elements 264 may be ball bearings 270 connected together via the radial suspension members 268. In such embodiments, as shown in FIGS. 5 and 7-8, the radial suspension members 268 may extend through the ball bearings 270, as indicated by dotted lines in FIG. 7.

Figure 12:
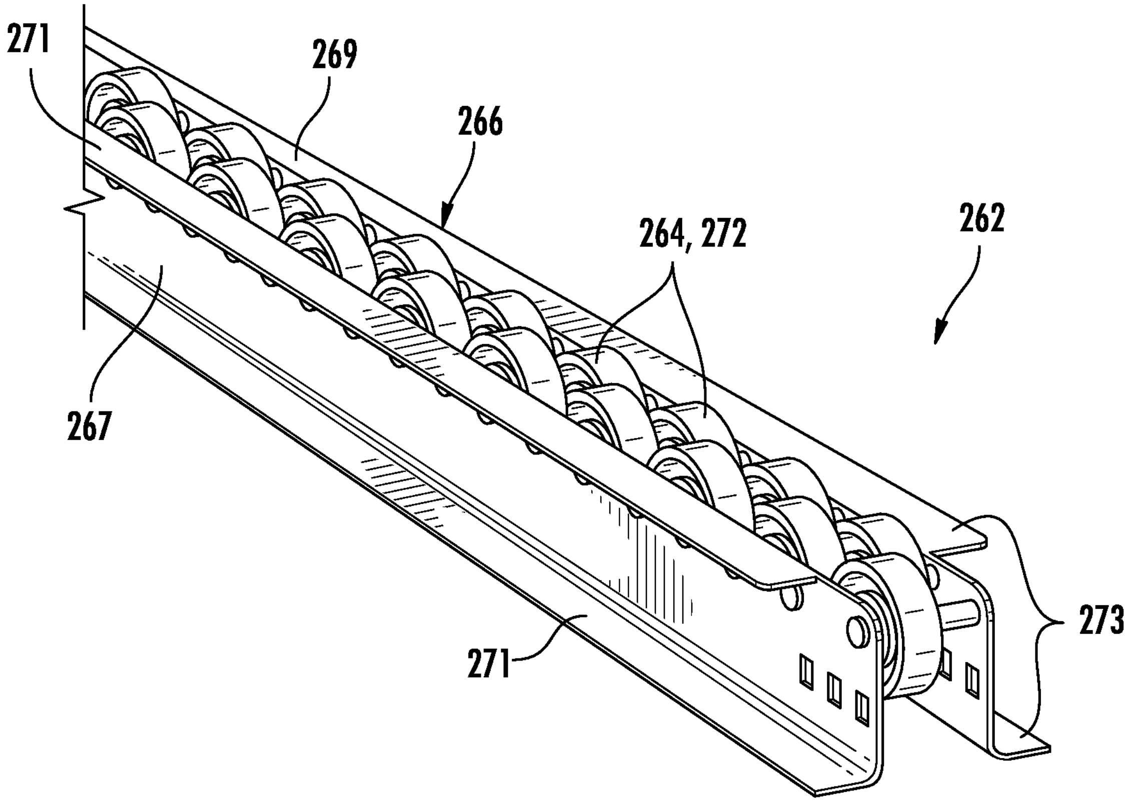
FIG. 12 is a perspective view of an embodiment of a plurality of roller elements for a suspension system for a cryogenic fuel system for an engine according to the present disclosure.

In further embodiments, as shown in FIG. 12, wherein the plurality of roller elements 264 are connected together via the guide rails 266, the plurality of roller elements 264 may be cylindrical roller elements 272, similar to wheels, connected together via the guide rails 266. Further, in an embodiment, as shown in FIG. 12, a first guide rail 267 and a second guide rail 269 may be arranged on opposing sides of one or more rows of the cylindrical roller elements 272.

In such embodiments, the first and second guide rails 267, 269 may include one or more flanges 271, 273, respectively, for securing the guide rails 266 to the inner surface 258 of the vacuum vessel 254 and the outer surface 260 of the cryogenic tank 252 (see FIG. 4).

Figure 9:
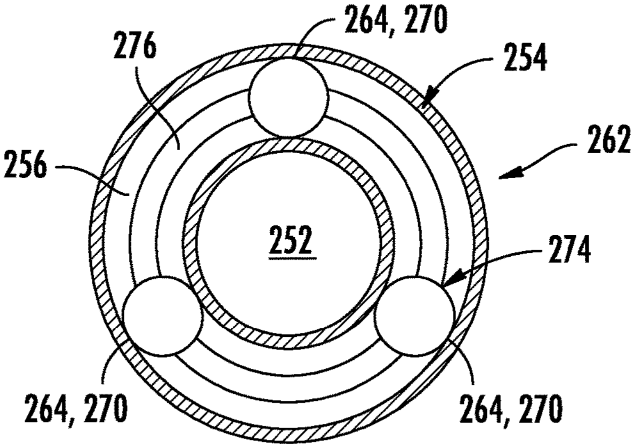
FIG. 9 is a cross-sectional view of the cryogenic fuel system of FIG. 8.

Furthermore, in an embodiment, as shown in FIGS. 5, 8, and 10, the plurality of roller elements 264 may be arranged into a plurality of rows 274 of roller elements 264. Thus, in such embodiments, as shown in FIGS. 6, 9, 11A, and 11B, the plurality of rows 274 of roller elements 264 may be circumferentially spaced around the cryogenic tank 252 within the vacuum space 256.

In additional embodiments, as shown in FIGS. 8 and 9, the suspension system 262 may also include at least one ring member 276 connecting the plurality of rows of roller elements 264 together. More particularly, in an embodiment, as shown, the suspension system 262 may include a first ring member 278 at a forward location of the cryogenic tank 252 and a second ring member 280 at an aft location of the cryogenic tank 252. It should be further understood that the ring members 276 described herein may be located at any other suitable location along a length of the cryogenic tank 252, such as at an intermediate location of the cryogenic tank 252. Thus, the ring members 276 are provided to maintain the arrangement of the roller elements 264 within the vacuum space 256 and to maintain the desired location of the cryogenic tank 252 within the vacuum vessel 254.

Referring particularly to FIGS. 5 and 6, the suspension system 262 may also include one or more insulation members 265 arranged between one or more (or each of) the roller elements 264. Thus, the insulation member(s) 265 are further configured to assist with suspending the cryogenic tank 252 within the vacuum vessel 254.

Figure 13:
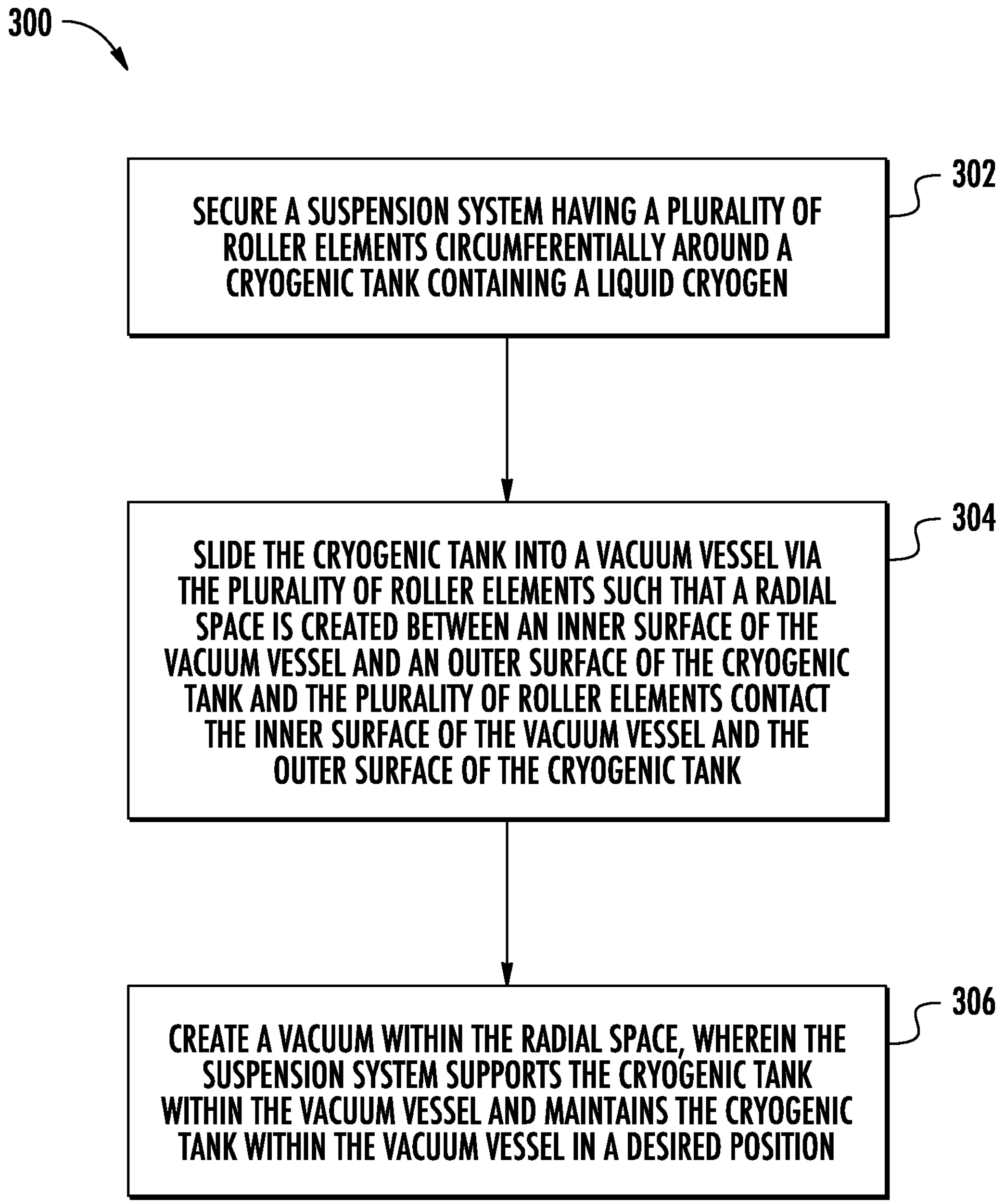
FIG. 13 is a flow diagram of an embodiment of a method of assembling a cryogenic system according to the present disclosure.

Referring now to FIG. 13, a flow diagram of an embodiment of a method 300 of assembling a cryogenic system according to the present disclosure is illustrated. In general, the method 300 is described herein for the turbojet engine 100 described above. However, it should be appreciated that the disclosed method 300 may be used for any other engine or suitable cryogenic application, such as a superconducting generator, having any suitable configuration. In addition, although FIG. 13 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes securing a suspension system having a plurality of roller elements circumferentially around a cryogenic tank containing a liquid cryogen. As shown at (304), the method 300 includes sliding the cryogenic tank into a vacuum vessel via the plurality of roller elements such that a radial space is created between an inner surface of the vacuum vessel and an outer surface of the cryogenic tank and the plurality of roller elements contact the inner surface of the vacuum vessel and the outer surface of the cryogenic tank. As shown at (306), the method 300 includes creating a vacuum within the radial space, wherein the suspension system supports the cryogenic tank within the vacuum vessel and maintains the cryogenic tank within the vacuum vessel in a desired position.

In particular embodiments, the method 300 may include opening the removable cap of the vacuum vessel prior to sliding the sliding the cryogenic tank into the vacuum vessel via the plurality of roller elements and subsequently closing the removable cap once the cryogenic tank is slid into place. In such embodiments, the suspension system containing the roller elements are configured to assist with assembly and positioning of the cryogenic tank within the vacuum vessel.

In particular embodiments, the method 300 of FIG. 13 may further include securing a radial suspension system having a plurality of roller elements circumferentially around the cryogenic tank. Further, the method 300 may include securing an axial suspension system having first and second axial suspension components and a plurality of roller elements axially with respect to the cryogenic tank. As such, the method 300 further includes assembling the radial suspension system together with the first axial suspension component and sliding the cryogenic tank into a vacuum vessel via the plurality of roller elements such that a space is created between the inner surface of the vacuum vessel and the outer surface of the cryogenic tank and the plurality of roller elements contact the inner surface of the vacuum vessel and the outer surface of the cryogenic tank. Moreover, the method 300 may include locking the radial suspension to the first axial suspension component, assembling a second axial suspension component, and then locking the first and second axial components to the radial suspension system. The assembly can then be completed by capping the open dome region with a welded, bolted or adhesively joined cap. Subsequently, the method 300 may include creating a vacuum within the radial space, wherein the suspension system supports the cryogenic tank within the vacuum vessel and maintains the cryogenic tank within the vacuum vessel in a desired position.

Although the aircraft 10 shown in FIG. 1 is an airplane, the embodiments described herein may also be applicable to other aircraft 10, including, for example, helicopters, unmanned aerial vehicles (UAV), and ship propulsion. In addition, the embodiments described herein may also be applicable to other applications in addition to turbojet engines, such as superconducting generators. The engines described herein are gas turbine engines, but the embodiments described herein also may be applicable to other engines. Further, the engine 100 is an example of a power generator using cryogenic fuel, but such fuel may be used as a fuel for other power generators. For example, the power generator may be a fuel cell (hydrogen fuel cell) where the hydrogen is provided to the fuel cell to generate electricity by reacting with air. Such power generators may be used in various applications, including stationary power generation systems (including both gas turbines and hydrogen fuel cells) and other vehicles beyond the aircraft 10 explicitly described herein, such as boats, ships, cars, trucks, and the like. Furthermore, the cryogenic systems described herein may be used in superconducting machines, such as superconducting generators, that may be used in various applications such as renewable energy and Mill machines.

Further aspects are provided by the subject matter of the following clauses:

A cryogenic system comprises a cryogenic tank containing a liquid cryogen, a vacuum vessel surrounding the cryogenic tank and providing a vacuum space between an inner surface of the vacuum vessel and an outer surface of the cryogenic tank, and a suspension system arranged within the vacuum space so as to support the cryogenic tank within the vacuum vessel and to maintain the cryogenic tank within the vacuum vessel in a desired position, the suspension system comprising a plurality of roller elements arranged within the vacuum space and contacting the inner surface of the vacuum vessel and the outer surface of the cryogenic tank.

The cryogenic system of the preceding clause, wherein the plurality of roller elements of the suspension system are arranged in a radial direction and an axial direction in the vacuum space.

The cryogenic system of any preceding clauses, wherein the plurality of roller elements arranged in the axial direction in the vacuum space are held in place via one or more axial suspension members and the plurality of roller elements arranged in the radial direction in the vacuum space are held in place via one or more radial suspension members.

The cryogenic system of any preceding clauses, wherein the one or more axial suspension members comprise one or more locking features configured to lock the one or more axial suspension members with respect to the one or more radial suspension members.

The cryogenic system of any preceding clauses, wherein the plurality of roller elements are connected together via one or more guide rails, and wherein the plurality of roller elements comprise cylindrical roller elements connected together via the one or more guide rails.

The cryogenic system of any preceding clauses, wherein the plurality of roller elements comprise ball bearings.

The cryogenic system of any preceding clauses, wherein the one or more radial suspension members extend through the ball bearings.

The cryogenic system of any preceding clauses, wherein the suspension system further comprises one or more insulation members arranged between one or more of the roller elements.

The cryogenic system of any preceding clauses, wherein the plurality of roller elements are arranged into a plurality of rows of roller elements circumferentially spaced around the cryogenic tank within the vacuum space.

The cryogenic system of any preceding clauses, wherein the suspension system further comprises at least one ring member connecting the plurality of rows of roller elements together.

The cryogenic system of any preceding clauses, wherein the cryogenic tank is slidable with respect to the vacuum vessel.

The cryogenic system of any preceding clauses, wherein the vacuum vessel comprises a removable cap.

The cryogenic system of any preceding clauses, wherein the cryogenic system is part of one of a turbojet engine or a superconducting generator. The cryogenic system of any preceding clauses, wherein the cryogenic tank and the vacuum vessel are each constructed of a composite material.

A method of assembling a cryogenic system, the method comprises securing a suspension system having a plurality of roller elements circumferentially around a cryogenic tank containing a liquid cryogen, sliding the cryogenic tank into a vacuum vessel via the plurality of roller elements such that a radial space is created between an inner surface of the vacuum vessel and an outer surface of the cryogenic tank and the plurality of roller elements contact the inner surface of the vacuum vessel and the outer surface of the cryogenic tank, and creating a vacuum within the radial space, wherein the suspension system supports the cryogenic tank within the vacuum vessel and maintains the cryogenic tank within the vacuum vessel in a desired position.

The method of any preceding clause, further comprising opening a removable cap of the vacuum vessel prior to sliding the sliding the cryogenic tank into the vacuum vessel via the plurality of roller elements and subsequently closing the removable cap once the cryogenic tank is slid into place.

The method of any preceding clause, further comprising connecting the plurality of roller elements together via one or more guide rails, wherein the plurality of roller elements comprise cylindrical roller elements connected together via the one or more guide rails.

The method of any preceding clause, further comprising connecting the plurality of roller elements together via one or more radial suspension members, wherein the plurality of roller elements comprise ball bearings connected together via the one or more radial suspension members.

The method of any preceding clause, further comprises arranging the plurality of roller elements in an axial direction in the vacuum space via one or more axial suspension members and in a radial direction in the vacuum space via one or more radial suspension members and securing the one or more axial suspension members to the one or more radial suspension members via one or more locking features on the one or more axial suspension members.

A cryogenic fuel system for a turbojet engine, the cryogenic fuel system comprises a cryogenic tank containing a liquid cryogen fuel for the turbojet engine, a vacuum vessel surrounding the cryogenic tank and providing a vacuum space between an inner surface of the vacuum vessel and an outer surface of the cryogenic tank, and a plurality of roller elements arranged within the vacuum space and contacting the inner surface of the vacuum vessel and the outer surface of the cryogenic tank at a plurality of different points along a longitudinal length of the cryogenic tank so as to support the cryogenic tank within the vacuum vessel and maintain the cryogenic tank within the vacuum vessel in a desired position.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A cryogenic system, comprising:

a cryogenic tank containing a liquid cryogen;

a vacuum vessel surrounding the cryogenic tank and providing a vacuum space between an inner surface of the vacuum vessel and an outer surface of the cryogenic tank; and a suspension system arranged within the vacuum space so as to support the cryogenic tank within the vacuum vessel and to maintain the cryogenic tank within the vacuum vessel in a desired position, the suspension system comprising:

a pair of axial suspension members disposed at axially opposite ends of the cryogenic tank; and a plurality of radial suspension members radially spaced and arranged circumferentially around the cryogenic vessel, each of the pair of axial suspension members and the plurality of radial suspension members comprising a plurality of roller elements arranged within the vacuum space and having a rounded outer surface in simultaneous point contact with the inner surface of the vacuum vessel and the outer surface of a tank wall of the cryogenic tank that bounds an interior volume containing the liquid cryogen.

2. The cryogenic system of claim 1, wherein the one or more axial suspension members comprise one or more locking features configured to lock the one or more axial suspension members with respect to the one or more radial suspension members.

3. The cryogenic system of claim 1, wherein the plurality of roller elements are connected together via one or more guide rails, and wherein the plurality of roller elements comprise cylindrical roller elements connected together via the one or more guide rails.

4. The cryogenic system of claim 1, wherein the plurality of roller elements comprise ball bearings.

5. The cryogenic system of claim 4, wherein the one or more radial suspension members extend through the ball bearings.

6. The cryogenic system of claim 1, wherein the suspension system further comprises one or more insulation members arranged between one or more of the plurality of roller elements.

7. The cryogenic system of claim 1, wherein the suspension system further comprises at least one ring member connecting the plurality of rows of roller elements together.

8. The cryogenic system of claim 1, wherein the cryogenic tank is slidable with respect to the vacuum vessel.

9. The cryogenic system of claim 1, wherein the vacuum vessel comprises a removable cap, wherein the removable cap is disposed adjacent to one of the axial suspension members of the pair of axial suspension members.

10. The cryogenic system of claim 1, wherein the cryogenic system is part of one of a turbojet engine or a superconducting generator.

11. The cryogenic system of claim 1, wherein the cryogenic tank and the vacuum vessel are each constructed of a composite material.

12. A method of assembling a cryogenic system, the method comprising:

securing a suspension system having a plurality of roller elements circumferentially around a cryogenic tank containing a liquid cryogen;

arranging the plurality of roller elements in an axial direction in the vacuum space via one or more axial suspension members and in a radial direction in the vacuum space via one or more radial suspension members;

sliding the cryogenic tank into a vacuum vessel via the plurality of roller elements such that a radial space is created between an inner surface of the vacuum vessel and an outer surface of the cryogenic tank and a rounded outer surface of each roller element of the plurality of roller elements is in simultaneous point contact with the inner surface of the vacuum vessel and the outer surface of a tank wall of the cryogenic tank that bounds an interior volume containing the liquid cryogen; and creating a vacuum within the radial space, wherein the suspension system supports the cryogenic tank within the vacuum vessel and maintains the cryogenic tank within the vacuum vessel in a desired position.

13. The method of claim 12, further comprising opening a removable cap of the vacuum vessel prior to sliding the cryogenic tank into the vacuum vessel via the plurality of roller elements and subsequently closing the removable cap once the cryogenic tank is slid into place.

14. The method of claim 12, further comprising connecting the plurality of roller elements together via one or more guide rails, wherein the plurality of roller elements comprise cylindrical roller elements connected together via the one or more guide rails.

15. The method of claim 12, wherein the plurality of roller elements comprise ball bearings.

16. The method of claim 12, further comprising:

securing the one or more axial suspension members to the one or more radial suspension members via one or more locking features on the one or more axial suspension members.

17. A cryogenic fuel system for a turbojet engine, the cryogenic fuel system comprising:

a cryogenic tank containing a liquid cryogen fuel for the turbojet engine;

a vacuum vessel surrounding the cryogenic tank and providing a vacuum space between an inner surface of the vacuum vessel and an outer surface of the cryogenic tank; and a plurality of roller elements arranged within the vacuum space and having a rounded outer surface in simultaneous point contact with the inner surface of the vacuum vessel and the outer surface of a tank wall of the cryogenic tank that bounds an interior volume containing the liquid cryogen fuel at a plurality of different points along a radial length and an axial length of the cryogenic tank so as to support the cryogenic tank within the vacuum vessel and maintain the cryogenic tank within the vacuum vessel in a desired position.

* * * * *